DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 12, 1970

874 O.G. 369

T874,004

DYEING POLYAMIDE FIBERS WITH A RED MONAZO ACID DYE

Stanley B. Speck, Wilmington, Del., assignor to E. I. du Pont de Nemours and Company, Wilmington, Del., a corporation of Delaware

Continuation-in-part of application Ser. No. 823,136, May 8, 1969. This application Nov. 12, 1969, Ser. No. 876,032

Int. Cl. D06p *1/10;* C09b *29/30*

U.S. Cl. 8—42

No Drawing. 14 Pages Specification

The process of dyeing polyamide fibers, especially in the form of carpets, to lightfast yellowish-red shades by contacting the fibers with an aqueous dyebath having a pH of 3.0 to 7.0 and containing disodium dodecyldiphenylether disulfonate and the red monazo acid dye of the structure

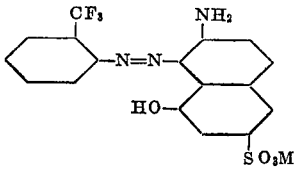

where M is H, ammonium radical or alkali metal; and, optionally, further containing non-ionic surface active agents such as the ethylene oxide adducts of long chain fatty alcohols. Wool and silk may also be dyed by this process.